United States Patent [19]

Kay

[11] Patent Number: 4,704,556
[45] Date of Patent: Nov. 3, 1987

[54] TRANSDUCERS

[76] Inventor: Leslie Kay, 82 Scarborough Road, Christchurch, New Zealand

[21] Appl. No.: 676,818

[22] Filed: Nov. 30, 1984

[30] Foreign Application Priority Data

Dec. 5, 1983 [NZ] New Zealand .......................... 206475
Jun. 5, 1984 [GB] United Kingdom .................. 8414282

[51] Int. Cl.$^4$ ..................... H01L 41/02; H01L 41/22; H04R 17/00; H01G 7/00
[52] U.S. Cl. ................................... 310/334; 310/366; 310/800; 367/164; 367/165; 381/174; 29/25.35
[58] Field of Search ............... 367/153, 155, 157, 164, 367/165, 173, 180, 149, 170; 310/366, 368, 365, 334, 800; 179/110 A, 111 R, 111 E, 107 FD; 381/191, 190, 176, 174, 173; 29/25.35

[56] References Cited

U.S. PATENT DOCUMENTS

| | | | |
|---|---|---|---|
| 2,497,672 | 2/1950 | Jaffe | 310/344 |
| 2,943,297 | 6/1960 | Steinberger et al. | 367/155 |
| 3,418,436 | 12/1968 | Neumann | 381/174 |
| 3,958,662 | 5/1976 | Brzezinski et al. | 181/171 |
| 4,028,647 | 6/1977 | Yee | 310/321 |
| 4,054,806 | 10/1977 | Moriki et al. | 310/318 |
| 4,066,984 | 1/1978 | Stern et al. | 333/30 R |
| 4,081,626 | 3/1978 | Muggli et al. | 179/111 R |
| 4,101,965 | 7/1978 | Ingebrigtsen et al. | 364/821 |
| 4,166,258 | 8/1979 | Tseng | 310/313 D |
| 4,376,919 | 3/1983 | Konno et al. | 331/158 |
| 4,403,117 | 9/1983 | Paglia | 179/111 R |
| 4,418,246 | 11/1983 | Sawyer | 381/173 |
| 4,455,502 | 6/1984 | Nakatani | 310/368 |
| 4,458,161 | 7/1984 | Wada et al. | 381/173 |
| 4,490,641 | 12/1984 | Takeuchi et al. | 310/366 |
| 4,584,590 | 4/1986 | Fischbeck et al. | 346/140 R |
| 4,621,171 | 11/1986 | Wada et al. | 381/173 |
| 4,651,310 | 3/1987 | Kaneko et al. | 310/800 |

FOREIGN PATENT DOCUMENTS

| | | |
|---|---|---|
| 19267 | 11/1980 | European Pat. Off. |
| 1437412 | of 1968 | Fed. Rep. of Germany |
| 209296 | of 1983 | Japan |
| 209297 | of 1983 | Japan |

OTHER PUBLICATIONS

"Acustica", vol. 4, No. 5, 1954, Kuhl et al.
"Radio & Electronic Engineer", Kay, vol. 44, No. 11, pp. 605–627, Nov. 1974.

Primary Examiner—John F. Terapane
Assistant Examiner—Eric Jorgensen
Attorney, Agent, or Firm—Spencer & Frank

[57] ABSTRACT

A transducer for effecting conversion between stress wave energy and electrical energy comprising a plurality of individual electrically conductive electrode elements presenting an array of coplanar electrode element faces, an overlying sheet of dielectric material carrying an electrically conductive film or coating on its side remote from the individual electrode elements and which is common to the individual electrode elements, means for supporting the sheet peripherally to lie freely on, but in tension over, the coplanar faces of the individual electrode elements, adjacent areas of which are spaced from each other by gaps which are sufficiently large compared with the thickness of the sheet to avoid or minimize shear stress transmission between adjacent areas of the sheet overlying respective adjacent individual electrode elements.

10 Claims, 2 Drawing Figures

TRANSDUCERS

BACKGROUND OF THE INVENTION

This invention relates to a transducer for effecting conversion between stress wave and electrical energy and to a method of making such a transducer.

The invention has been developed in relation to transducers required for certain forms of apparatus (hereinafter referred to as being of the kind specified) but is capable of application generally to stress wave-electrical tranducers.

Apparatus of the kind specified is intended to provide data relating to an object (including, for example, data as to the existence or position of the object or one or more characteristics of the object) otherwise than by direct vision, and the object data may be ascertained or read either by human perception (as by visual display or by audible or tactile display) or by machine vision.

In a specific form of apparatus of the kind specified the apparatus comprises a combination of (a) transmitting means for transmitting stress wave energy (hereinafter called the transmitted signal) to a field of view to illuminate the object with such energy, (b) receiving means for receiving at least part of the energy (herein called the received signal) reflected from the object when in the field of view and effectively forming an image in respect of the illumination of the object by the transmitted signal, (c) means for imposing predetermined characteristics upon at least part of the signals giving rise to the image in respect of at least one of the parameters pertaining thereto and selected to establish that the image shall contain the required object data, (d) means for analysing the image derived from the stress wave energy.

The term "image" used herein is to be deemed to include a plurality of signals (readable by human perception or by machine, as appropriate) whether presented serially in time or in spacial juxtaposition or separation and collectively representing the existence, position or attitude of the object, or one or more dimensions thereof, or the configuration or area of the object viewed from any direction.

In a particular form of apparatus of the kind specified the means for imposing predetermined characteristics upon the signals giving rise to the image may differ widely in accordance with the particular data concerning the object which the received signal is required to carry. Thus, if one of the characteristics which the image is required to present is the range or distance of the object or some part thereof from a predetermined point, e.g. the station at which the transmitting means is situated, then the means for imposing the predetermined characteristic may comprise a means for frequency modulating the stress wave transmitted signal in a mode such that the frequency difference between the transmitted signal and the received signal, due to the elapse of transit time between initial radiation of the signal and receipt of the reflection, is representative of the range or distance. In such a case the means for imposing the predetermined characteristic would appropriately impose a frequency sweep on the transmitted signal which may be linear or non-linear but preferably of saw-tooth form.

If the required object data includes information concerning the lateral or angular position of the object, or a part thereof, or the angular width subtended by the object at a predetermined point, e.g. that at which the transmitting means is situated, then the means for imposing a predetermined characteristic may include means to establish that the transmitted signal and/or the received signal is radiated and/or received respectively by way of a beam represented conveniently as a polar diagram with the radius vector centered on a predetermined point and having a maximum value in the central region of said beam and a minimum value at each of two opposite boundaries thereof in a reference plane. The reference plane may be horizontal, vertical, or in some intermediate angular position.

In some cases it may be advantageous to provide transmitting and/or receiving means in which the beam is convergent to a focus or a focal region spaced longitudinally of the transmitting and/or receiving means along an axis extending outwardly into the field of view.

The means for imposing predetermined characteristics on the transmitted and/or received stress wave signals may further include means for scanning the beam angularly through the field of view between boundaries thereof, e.g. in an azimuthal plane or in an elevational plane, or both, or in some intermediate plane.

Transducers for effecting conversion between stress wave energy and electrical energy are required for incorporation in the transmitting means and the receiving means. Possibly a transducer common to both the transmitting means and the receiving means may be used.

The speed or frequency at which such mode of operation is required to be carried out often precludes the use of mounting means for the transducers permitting the transducers to be moved physically to the different angular positions required.

It is known that such beams may be moved angularly or scanned by the use of a transducer which comprises an array of transducer elements connected to the power amplifier or output element of the transmitting means or to the input element of the receiving means through respective channels which include means for imposing a phase difference or time difference between the signals fed to the transducer elements or received therefrom as the case may be, thereby electronically effecting angular deflection of the beam.

The performance of such an array is adversely affected by the need to provide individual transducer elements to form such array and one of the principal objects of the present invention is to avoid or reduce this disadvantage as well as to provide for reduction in the cost of manufacturing such a transducer array.

Further, in cases where it is required to provide a beam either for the transmitting or receiving means of a form which is convergent to a focus or focal region spaced longitudinally from the transducer means along said axis, the need to provide individual tranducer elements imposes considerable complications and contributes to the cost of providing an appropriate array, and imposes considerable limitations on the extent to which the size of the array can be reduced.

SUMMARY OF THE INVENTION

According to the invention there is provided a transducer for effecting conversion between stress wave energy and electrical energy comprising a plurality of transducer elements collectively forming an array and each of which includes opposing conductive electrode means and an intervening dielectric element wherein at least the dielectric element comprises a lamina (the first lamina) common to the tranducer elements.

Advantageously, one of the opposing electrode means may also comprise a further lamina (the second lamina) which is common to the transducer elements.

In a preferred form the invention applicable to airborne stress wave energy comprises a transducer for effecting conversion between airborne stress wave energy and electrical energy comprising a plurality of individual electrically conductive electrode elements presenting an array of coplanar electrode element faces, an opposing sheet of dielectric material carrying an electrically conductive film or coating on its side remote from the individual electrode elements and which is common to the individual electrode elements, means for supporting the sheet peripherally to lie freely on, but in tension over, the coplanar faces of the individual electrode elements, adjacent ones of which are spaced from each other by gaps which are sufficiently large compared with the thickness of the sheet to avoid or minimise shear stress transmission between adjacent areas of the sheet overlying respective adjacent individual electrode elements.

The transducer may be combined with time delay means connected to each of, or selected, channels or conductors connected to respective electrode elements of the array, the time delay means imposing respective time delays of such magnitude as to establish a convergent or focused beam.

Further, the transducer may be combined with variable time delay means connected to each of, or selected, channels or conductors connected to respective electrode elements of the array, and means for varying the magnitudes of the respective time delays to establish scanning of a beam provided by the array.

The first lamina may be in the form of a sheet of dielectric material and the second lamina may comprise an electrically conductive film or coating on the sheet.

From a further aspect the invention resides in a method of making a multi-channel transducer for effecting conversion between airborne stress wave energy and electrical energy, such method comprising laying a sheet of dielectric material over coplanar faces of an array of spaced apart, electrically conductive, electrode elements, securing the sheet peripherally around the array, and providing a further conductive electrode means on the side of the lamina opposite to the array.

The further conductive electrode means may conveniently comprise a further lamina (the second lamina) formed as a film or coating on the first lamina.

BRIEF DESCRIPTION OF THE DRAWINGS

The invention will now be described, by way of example, with reference to the accompanying drawings wherein.

DESCRIPTION OF THE PREFERRED EMBODIMENTS

Echo location systems (being one form of apparatus of the kind specified) operating in air as aids for the blind commonly use solid dielectric transducers for both radiating and receiving ultrasonic waves. One such system is described by KAY in the Radio and Electronic Engineer, Volume 44, No. 11, pp. 605–627 and dated November, 1974. On page 610 is described the transducer design used in the system. The radiation and receiving field of the transducer is fixed in space relative to the active face and can be moved only by physically moving the transducer.

A line array of transducers of the type described can be used to form a radiation field by suitably coupling them together through an electrical network. When all the signals at the transducer terminals are in phase coincidence a narrower beam is formed which is perpendicular to the active face of the array. Applying a phase delay between each element causes the beam to be deflected from the perpendicular direction by an amount determined by the phase delay. Alternatively, a time delay can be used between each element to produce a deflection of the beam from the perpendicular. Both of these methods of beam deflection or beam scanning are now well known principles used in radar, sonar and ultrasonic testing in solids or body tissue.

The embodiment of the present invention now illustrated and described in effect provides a transducer array as a single unit but with individual channel access to elements of the array. It is not only more convenient to incorporate in apparatus of the kind specified and other forms of apparatus than would be the case were individual transducer elements utilized to form the array, but can also be manufactured more economically and provide improved performance as regards beam deflection or scanning whilst avoiding the necessity to move the array physically.

In the embodiment illustrated a plurality of electrically conductive electrode elements 10 are provided. These may be of electrically conductive metal or a conductive plastics material, or of a plastics material (an insulator) coated with electrically conductive metal.

Figure 1:
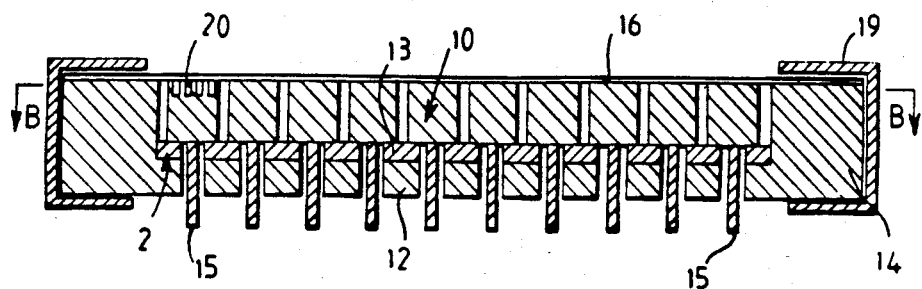
FIG. 1 is a view in cross-section on the line A—A of FIG. 2 through one embodiment of transducer in accordance with the invention and made by the method thereof.
Figure 2:
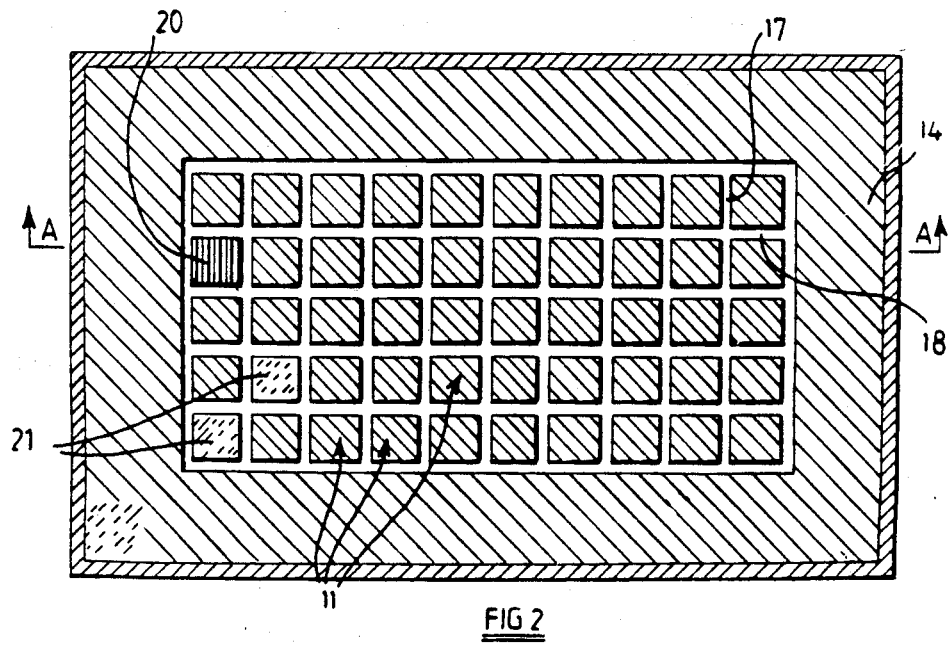
FIG. 2 is a view in cross-section on the line B—B of FIG. 1.

The elements may conveniently be of cubic form, although the height dimension as seen in FIG. 1 and the width dimensions as seen in FIG. 2 need not necessarily be equal.

The elements 10 are mounted in an array with their top faces 11, as seen in FIG. 2, coplanar and their bottom faces supported by a base plate 12 through the intermediary of an intervening plate 13 of insulating material.

The plate 12 may be formed integrally with an outer frame 14, the top face of which is coplanar with the top faces 11 of the elements 10. The frame 14 and the base plate 12 may be formed of metal or a plastics (insulating) material as desired.

The base plate has openings in alignment with respective elements 10 to provide for passage of conductors 15 for connection to respective electrode elements 10. The latter may be made of metal or conductive plastics material, or may be made of insulating material with an electrically conductive coating on at least their top faces to which, in this case, the conductors 15 would be connected.

On the top faces 11 of the electrode elements 10 is laid a sheet of dielectric material such as "Mylar" (the first lamina hereinbefore referred to) and which is coated on its top surface remote from the electrode elements 10 with a film of conducting material, for example aluminium or gold (the second lamina hereinbefore mentioned).

Because of the scale of the drawings these two laminae are not shown separately and a single reference 16 designates them collectively.

Conveniently the sheet 16 is secured to the top surface of the frame 14 adhesively. For this purpose the top surface of the frame 14 is preferably roughened on a suitable flat scratching material. The top surfaces of the electrode elements 10 may be roughened as indicated at 21 (shown in two instances only). This assists in establishing the existence of an air film between the sheet 16 and the top surfaces of the electrodes and determines the frequency response characteristic of the transducer over a (higher) range of frequencies, typically 70 KHz to 300 KHz. Conveniently the roughening of these surfaces of the electrode elements and the top surface of the frame 14 may be carried out at the same time in a single operation, although this is not essential. A typical grit size of 60-280 may be used for effecting the roughening, for example, according to the frequency response required from the transducer. The top surface of the elements may be appropriately machined to produce grooves as seen at 20. This controls the frequency response characteristic in another (lower) range of frequencies, typically 30 KHz to 100 KHz. This would preferably be done additionally to roughening, although for simplification roughening and grooving has been shown only on separate elements in the drawings. Likewise the top surface of the frame may be machined either separately or at the same time.

The roughening and grooving may be carried out on all of the electrode elements or selected elements only as determined by the characteristics to be achieved.

The thickness of the sheet 16 may typically be 5.0 microns and the film or coating of conductive material 0.05 microns. Preparatory to coating the top surface of the frame 14 with glue and laying the sheet 16 thereover, the sheet may be tensioned in its own plane by an amount depending upon the frequency response required. In some circumstances the tension need be sufficient only to remove any wrinkles from the sheet. Clamps 19 may be provided to embrace and protect the peripheral margin of the sheet 16 and the frame 14 and left in position permanently to provide an electrical connection to the conducting lamina—the second lamina.

The electrode elements 10 are insulated electrically from each other by the provision of lateral gaps 17 and 18 between them. These may be air gaps but could contain solid state insulating material if required.

The sheet 16 is not fixed to the top faces of the electrode elements 10, nor is the sheet 16 clamped or similarly constrained over those areas which lie above the gaps 17 and 18 between individual electrode elements 10 whether the gaps are air-filled or contain solid state insulating material. The sheet lies freely on the coplanar faces of the electrode elements but without excluding an air layer between these faces and the sheet, the boundaries of the air layer being, in effect, defined by the roughened and grooved faces of the elements 10 and the overlying face of the sheet.

The gaps 17 and 18 extending in mutually perpendicular directions of the array may be equal and are preferably substantially greater than the thickness of the sheet 16. A typical value for the thickness of the sheet would be, as mentioned, 5 microns whereas each of the gaps 17 and 18 would typically be 500 microns. This provides for satisfactory operation of the transducer in the frequency range 30 KHz to 300 KHz, although if desired the range may be limited to 100 KHz to 200 KHz.

Because each electrode element 10 is required to radiate or receive signals independently, or nearly independently, of each other, and since radiation action is one of movement of deformation of the dielectric lamina either towards or away from the top face of the electrode element 10, it would seem natural to clamp the dielectric sheet in the gaps 17 and 18 between the elements. It is one of the primary features of the invention that the dielectric is not clamped opposite these gaps and this materially contributes to reducing the difficulty and cost of manufacture.

By adoption of a gap width for the gaps 17 and 18 which is wide compared with the thickness of the dielectric, shear forces which could propogate through the dielectric across the gaps 17 and 18 are attenuated sufficiently to make them negligible and avoid or reduce stress coupling between the transducer elements each constituted by an electrode element 10, the portion of the dielectric sheet lying on top of such element, and the further electrode means comprising the film or coating of conductive material (the second lamina) on top of the sheet.

Although the specific embodiment described and illustrated shows the top surfaces of the electrode elements as lying in a single flat plane, it will be understood that it would be within the scope of the invention for these surfaces (collectively) to present some other shape consistent with ability to stretch a sheet such as 16 over the exposed surfaces of these elements in contact therewith but without air exclusion, preferably the form of the air layer being controlled by roughening and grooving as previously described. Thus, the upper surfaces of the elements 10 could thus collectively present a convex cylindrical shape should this be desired, and the term "coplanar" is to be deemed to include such arrangements.

An application of the invention to a transducer required to provide a convergent or focus beam would include time delay means connected in series with each of, or a selected number of, the conductors 15 to impose increments of time delay in radiation (or reception) of wave energy from the electrode elements 10 systematically over the array.

To effect scanning further variable time delay means may be provided in each of the conductors or selected conductors 15. Such variable time delay means is preferably activated electronically to achieve rapid cyclic scanning movements of the beam to establish scanning of the field of view.

I claim:

1. A transducer for effecting conversion between airborne stress wave energy and electrical energy comprising a plurality of individual electrically conductive electrode elements presenting an array of coplanar electrode element faces, a plurality of electrical conductors each individually conductively connected to a respective one of said elements, a flexible sheet of dielectric material overlying said electrode elements and carrying an electrically conductive film on its side remote from said electrode elements, and means for supporting the sheet peripherally to lie freely on, but in tension over, the coplanar faces of said electrode elements for movement toward and away from said elements in a manner corresponding to the airborne stress wave energy, and wherein adjacent ones of said elements are spaced from each other by gaps which are sufficiently large compared with the thickness of the sheet to avoid or minimise shear stress transmission between adjacent areas of the sheet overlying respective adjacent individual electrode elements.

2. A transducer according to claim 1 wherein the surface of the electrode elements presented towards the sheet are roughened to an extent such as to influence the frequency response characteristic of the transducer.

3. A transducer according to claim 2 wherein the surface of the electrode elements presented towards the sheet incorporate grooves of such size, number and arrangement as to influence the frequency response characteristic of the transducer.

4. A transducer as defined in claim 1 wherein each of the gaps is about $500\mu$.

5. A transducer as defined in claim 4 wherein the thickness of said sheet is about $5\mu$.

6. A transducer according to claim 1 wherein the sheet of dielectric material is supported around the periphery of the array by a frame serving also to tension the sheet.

7. A transducer according to claim 1 wherein each of the gaps is about 100 times the thickness of said sheet.

8. A method of making a multi-channel transducer for effecting conversion between airborne stress wave energy and electrical energy comprising laying a flexible sheet of dielectric material having an electrically conductive film on one side over coplanar faces of an array of spaced apart electrically conductive electrode elements each having a respective individual electrical conductor, so that the one side of the sheet of the dielectric material faces away from the electrode elements, securing the sheet peripherally around the array in a state of tension but free from the electrode elements themselves for permitting movement of said sheet toward and away from said elements in a manner corresponding to the airborne stress wave energy, and, before said step of laying a flexible sheet of dielectric material, spacing adjacent ones of the conductive electrode elements from each other by gaps which are sufficiently large compared with the thickness of the sheet to avoid or minimize shear stress transmission between adjacent areas of the sheet overlying respective adjacent individual electrode elements.

9. A method according to claim 8 wherein securement of the sheet peripherally is effected by providing a frame surrounding the array of electrode elements and adhesively attaching a margin of the sheet to the frame.

10. A method according to claim 8 wherein the faces of the electrode elements presented towards the sheet are subjected to roughening and/or grooving before securing the sheet peripherally.

* * * * *